April 15, 1969  YOSHIYA MATSUI  3,438,695

HIGH SPEED CATADIOPTRIC OPTICAL SYSTEM OF CASSEGRAIN TYPE

Filed Aug. 2, 1967

INVENTOR.
YOSHIYA MATSUI
BY
ATTORNEY

United States Patent Office 3,438,695
Patented Apr. 15, 1969

3,438,695
HIGH SPEED CATADIOPTRIC OPTICAL SYSTEM OF CASSEGRAIN TYPE
Yoshiya Matsui, Tokyo, Japan, assignor to Cannon Camera Kabushiki Kaisha, Tokyo, Japan, a corporation of Japan
Continuation-in-part of application Ser. No. 343,558, Feb. 10, 1964. This application Aug. 2, 1967, Ser. No. 669,635
Int. Cl. G02b 17/08
U.S. Cl. 350—201     2 Claims

ABSTRACT OF THE DISCLOSURE

Catadioptric optical system having an aperture ratio above 1:4 in which the elements constituting the correcting member and main member are reduced to a minimum. The present invention provides a long focus catadioptric optical system consisting of four components: a correcting member of a single negative meniscus lens concave to the object, a main member consisting of a single positive meniscus lens concave to the object and a main mirror on its rear surface, a second mirror convex to the main member, and an achromatic compound lens disposed within the centering aperture of the main member facing to the second mirror and forming the image behind itself. Thus the number of elements constituting the large correcting member and the main member is reduced to minimum, i.e., two, and the thicknesses of these elements are reduced to decrease the weights thereof, and yet aperture ratio above 1:4 is obtained.

---

This application is a continuation-in-part of the application Ser. No. 343,558, which is now abandoned.

This invention relates to an optical system, especially a catadioptric system appropriate to still-cameras, motion-picture cameras, television cameras and other devices that require the high speed, long focal length objective. An optical system of this invention has a speed faster than 1:4, which surpasses conventional Cassegrain type systems and avoids the difficulties in night photography.

The object of this invention is to provide a catadioptric optical system of Cassegrain type which is compact, light, of low cost, with the speed faster than 1:4, and the covering angle more than 3°, and in which the image field appears in the outer side of the whole optical system.

The other object of this invention is to provide a catadioptric optical system which is simply constructed, short in the whole length, and in which, in spite of the speed faster than 1:4, the excellent correction of spherical and chromatic aberrations as well as astigmatism and distortion are maintained.

Other objects, advantages and features of this invention will become more apparent from the following description of an illustrative embodiment in conjunction with the drawing in which.

Figure 1:
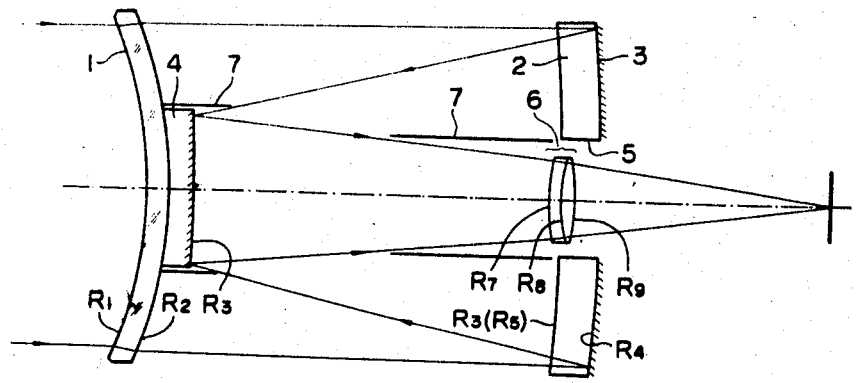
FIG. 1 illustrates an illustrative embodiment of the high speed catadioptric optical system of Cassegrain type according to the present invention.

For the description of the present invention, which attains these above objects, reference will be made to the accompanying drawings.

The catadioptric optical system in accordance with the present invention consists of four components: a correcting member of a single negative miniscus lens 1 concave to the object, a member consisting of a single positive meniscus lens 2 with the concave side to the object and a main mirror 3 on its rear surface, a second mirror 4 convex to the main member, and an achromatic compound lens 6 laid in the centering aperture 5 of the main mirror 3 and forming the image behind itself.

Furthermore, the present optical system satisfies the following conditions:

(I) The distance between the front vertex of the correcting lens 1 and the image surface is of a value from $0.7f$ to $0.6f$;

(II) In the correcting lens 1, $$0.35f < |R_1| < |R_2| < 0.5f$$
$$d_1 < 0.04f$$

(III) In the main member, $$1.3f < |R_4| < |R_3| < 1.6f$$
$$d_2 < 0.05f$$

(IV) Concerning to the air spacings, $$0.3f < l_1, \quad l_2 < 0.4f$$
$$0.25f < l_3 < 0.4f$$

and (V) In the second mirror 4, $$0.9f < |R_6| < 1.4f$$

where:

$f$ denotes the focal length of the whole system,
$R_1 R_2$—radii of curvature of the refractive and reflective surfaces, respectively, each subscript being a successive number according to the passage of light,
$d_1 d_2$—axial thicknesses of the respective lenses in the order as mentioned above, and
$l_1 l_2$—air spacings in the order as mentioned above.

As shown in FIG. 1, a cylindrical element 7 is provided as a shading hood or a screening member for preventing the entering of undesirable light rays, which is inherent in the catadioptric optical system of Cassegrain type.

The essential requirements in the design of an optical system which fulfills these objects mentioned in the top of the specification, are as follows:

(a) The distance between the front vertex of the system and the image surface should be as short as posisble.

(b) The large components such as the correcting lens and the main member should be made up of the members as few as possible, and they should be as thin as possible.

(c) Other composing elements should also be made up of members as few as possible.

(d) For the purpose to obtain the covering angle more than 3° and the speed faster than 1:4, the spherical aberration correction should be as good as possible and the excessive deterioration of Petzval sum should possibly be defined.

If the requirement (a) is taken into account excessively, it necessarily increases a refractive power of each component, and makes it difficult to attain the good correction of aberrations with the optical system composed of a minimized number of elements. The contradictory requirements (b) and (c) to avoid the increase of element numbers and the requirements (a) are correlated with each other as well as the requirement (d) to obtain good correction of spherical aberration and to avoid deterioration of the Petzval sum.

The condition (I) hereinbefore described is introduced for satisfying these requirements as well as the conditions (II) to (V). Excessive shortening of the total distance (the distance between the front vertex of the correcting lens 1 and the image surface) brings about an increase in a refractive power of each element. With the optical system composed of a "minimum number of elements" as it is in this invention, it is difficult to attain a good correction of aberration and to avoid the deterioration of Petzval sum. Lower limit in the condition (I) that the total distance should be larger than $0.6f$ is an answer to this difficulty. As it is a practical requirement to make the total distance shorter we settled the upper limit of the total distance as $0.7f$.

The condition (I) that the total distance should be of a value from $0.7f$ to $0.6f$ is settled with an intention to approach an optical system of shorter distance with minimum number of elements, the performance of which is excellent. The conditions (II) to (V) satisfy the above-mentioned requirements in association with the condition (I).

The condition (IV) concerning air spacings is effective for aberration correction under the restricting influence of condition (I), for preventing the passage of undesirable light rays inherent in the catadioptric optical system of Cassegrain type, and yet brings the image plane to the position so far behind the optical system. If the air spacings $l_1$ and $l_2$ become shorter than $0.3f$, prevention of the passage of undesirable light rays becomes imperfect and a screening member does not act well. If they become longer than $0.4f$, it becomes difficult to bring the image plane to the position in the back exterior of the optical system.

In order to correct all kinds of aberrations including chromatic ones in fulfilling the requirements (b) and (c), it is very effective to satisfy the condition (II), (III) and (V), and to dispose the rear compound achromatic lens. Among these conditions, the condition (II) contributes especially to correct the spherical aberration well, and the condition (V) to decrease Petzval sum effectively, and the condition (III) contributes to compensate the chromatic aberrations, caused by a correcting member 1 of a single negative miniscus lens, over the whole image field, with the multiplying effect of disposition on the rear compound achromatic lens. The condition (III) is the most important one to ensure the complete correction of the on-axial and off-axial chromatic aberrations for this invention, with such a minimum number of elements as only 4 members. The limitations of the thicknesses of glasses in the conditions II and III are necessary only for the purpose of decreasing the total weight and they have nothing to do with the correction of aberrations. The limitations of radius of curvature is important for the correction of aberrations.

In the condition (II), $|R_1|<|R_2|$ is a necessary condition for compensating under-corrected spherical aberration introduced by the main member. While satisfying this condition, to achieve the correction of aberration, there is a certain freedom in the selection of values to be assigned to $R_1$ and $R_2$, respectively. Generally speaking, when the values are decreased, i.e., absolute values of $R_1$ and $R_2$ are selected to be small, it is necessary to decrease the difference between $|R_1|$ and $|R_2|$, while when the values are increased, i.e., absolute values of $R_1$ and $R_2$ are selected to be large, it is necessary to increase the difference between $|R_1|$ and $|R_2|$. In the former case, when the values are selected to be excessively small, over-corrected spherical aberration is brought about, so that for avoiding this defect, $0.35f<|R_1|<|R_2|$ is a necessary limitation. In the latter case, when the values are selected to be excessively large, the refractive power of the correcting lens 1 becomes excessively negative so that the correction of chromatic aberration is deteriorated. For avoiding this defect, $|R_1|<|R_2|<0.5f$ is a necessary limitation.

By satisfying the condition (II), the refractive power of the correction lens 1 becomes somewhat negative, i.e., chromatic aberration is over-corrected. In this state and for simultaneously eliminating on-axial and off-axial chromatic aberrations, it is a necessary condition to maintain the main mirror in the state of under-corrected chromatic aberration and to provide a compound achromatic lens in the rear portion. $|R_4|<|R_3|$ in the condition (III) is necessary for making the main mirror in the state of under-corrected chromatic aberration. In this case, there is a certain freedom in the selection of values to be assigned to $R_3$ and $R_4$, and the values are to be selected depending mainly upon the condition (IV). The shorter the air spacings $l_1$ and $l_2$ the smaller the $R_3$ and $R_4$, and it becomes difficult to make the system compact. The lower limit for avoiding this defect is the condition of $1.3f<|R_4|<|R_3|$. On the other hand, when larger values are assigned to $R_3$ and $R_4$, the air spacings $l_1$ and $l_2$ become longer, so that it is also difficult to make the system compact. For avoiding this defect, the upper limitation of $|R_4|<|R_3|<1.6f$ is necessary.

The role of the second mirror in the Cassegrain type catadioptric system is to partially correct the aberration of the main mirror and simultaneously to form the image surface at a suitable position outside of the optical system. With respect to aberration correction, the second mirror has a convex surface and a sign opposite to that of the main mirror regarding spherical aberration, coma, astigmatism, Petzval and distortion, and the selection of the value of $R_6$ is very important for balancing aberrations of the whole system. Under the conditions of (I) through (IV), the most appropriate value of $R_6$ for maintaining the good conditions of spherical aberration, coma, astigmatism and distortion, it is natural that there must be a limitation for the value of $R_6$. And such limitation on $R_6$ must maintain the good Petzval sum of the whole optical system and produce the image surface at an appropriate position outside of the optical system. For balancing the aberrations, while satisfying the conditions (I) through (IV), it is necessary that $0.9f<|R_6|<1.45$. When $0.9f<|R_6|$ is not satisfied, the excessive under-correction of Petzval sum is brought about, so that the quality of the optical system is deteriorated. When $|R_6|<1.45$ is not satisfied, it becomes difficult to form the image surface at a sufficient distance outside of the optical system.

Numerical values of the embodiments of the present invention are as follows:

EXAMPLE 1

$f=1$    Relative aperture=1:3.3

Covering angle=3.3°    Back focus=0.24111

| | | | |
|---|---|---|---|
| $R_1=-0.40128$ | $d_1=0.025$ | $N_1=1.51633$ | $V_1=64.1$ |
| $R_2=-0.42642$ | $l_1=0.367$ | | |
| $R_3=-1.45056$ | $d_2=0.0375$ | $N_2=1.51633$ (Reflecting surface) | $V_2=64.1$ |
| $R_4=1.38689$ | $d_3=d_2$ | $N_3=N_2$ | $V_3=V_2$ |
| $R_5=R_3$ | $l_2=0.345$ | | |
| $R_6=-1.14059$ | $l_3=0.33485$ | (Reflecting surface) | |
| $R_7=0.625$ | $d_4=0.00875$ | $N_4=1.67270$ | $V_4=32.2$ |
| $R_8=0.25319$ | $d_5=0.0125$ | $N_5=1.58913$ | $V_5=61.2$ |
| $R_9=-1.07401$ | | | | where $R_1R_2$—radii of curvature of the refractive and reflective surfaces, respectively, in the direction of the passage of light, $d_1 d_2$—axial thicknesses of the respective lenses,
$l_1 l_2$—air spacings, in the order as mentioned above,
$N_1 N_2$—refractive indices of the respective lenses for a spectrum light $d$, in the order as mentioned above, and
$V_1 V_2$—Abbe number for the respective lenses in the order as mentioned.

The 3rd order aberration coefficients of this embodiment are as follows:

| Ordered numbers of the surfaces | I | II | III | P |
|---|---|---|---|---|
| 1 | −3.475340 | 7.511183 | −16.23377 | −0.8485669 |
| 2 | 2.860119 | −6.182126 | 13.36261 | 0.7985388 |
| 3 | −0.0612425 | 0.1740077 | 0.4944056 | −0.2347458 |
| 4 | 0.5553940 | −1.490728 | 4.001250 | −0.9510300 |
| 5 | 0.4819830 | −1.232597 | 3.152180 | −0.2347458 |
| 6 | −0.4864820 | 1.232755 | −3.123827 | 1.753478 |
| 7 | −0.0063581 | 0.0786725 | −0.9734608 | 0.6434626 |
| 8 | 0.0004968 | 0.0040078 | 0.032300 | −0.1241727 |
| 9 | 0.2373005 | −0.2485940 | 0.2604251 | 0.3451782 |
| Σ | 0.1058710 | −0.1534198 | −0.0166592 | 1.147396 |

| Ordered numbers of the surfaces | V | L | T |
|---|---|---|---|
| 1 | 36.91971 | −0.0162702 | −0.0351640 |
| 2 | −30.60923 | 0.0156330 | −0.0337906 |
| 3 | 2.071727 | −0.0045242 | 0.0128545 |
| 4 | −8.187070 | 0.0000000 | 0.0000005 |
| 5 | −7.460893 | 0.0054168 | −0.0138528 |
| 6 | 3.472493 | 0.0000000 | 0.0000000 |
| 7 | 4.083257 | −0.0011187 | 0.0138462 |
| 8 | −0.7408657 | −0.0014923 | −0.0120342 |
| 9 | −0.6344251 | 0.0022071 | −0.0023122 |
| Σ | −1.85294 | −0.0001484 | −0.0001342 |

In the above table nomenclatures I, II, III, P, V, L and T are the 3rd order aberration coefficients relating to spherical aberration, coma, astigmatism, distortion, longitudinal chromatic aberration and lateral chromatic aberration respectively. The chromatic aberration coefficients L and T are calculated for spectral line $g$ and $d$. Contributions of these coefficients to the lateral aberration are defined as follows:

$$-\frac{\Delta Y}{(S-t)\beta} = \rho \cos \phi \Sigma L + \left(\frac{Y}{S-t}\right)\Sigma T +$$
$$\frac{1}{2}\rho^3 \cos \phi \Sigma I + \frac{1}{2}\left(\frac{Y}{S-t}\right)\rho^2(2+\cos 2\phi) \Sigma II +$$
$$\frac{1}{2}\left(\frac{Y}{S-t}\right)^2 \rho \cos \phi (3\Sigma III + \Sigma P) + \frac{1}{2}\left(\frac{Y}{S-t}\right)^3 \Sigma V$$

and $$-\frac{\Delta Z}{(S-t)\beta} = \rho \sin \phi \Sigma L + \frac{1}{2}\rho^3 \sin \phi \Sigma I +$$
$$\frac{1}{2}\left(\frac{Y}{S-t}\right)\rho^2 \sin 2\phi \Sigma II + \frac{1}{2}\left(\frac{Y}{S-t}\right)^2 \rho \sin \phi (\Sigma III + \Sigma P)$$

where $\Delta Y$, $\Delta Z$—meridional and saggital components of the lateral aberration,
$S$—distance to object plane,
$t$—distance to entrance pupil,
$\beta$—image magnification factor,
$Y$—object height,
$\rho$—radius of entrance pupil, and
$\phi$—azimuth of entrance pupil.

Figure 2:
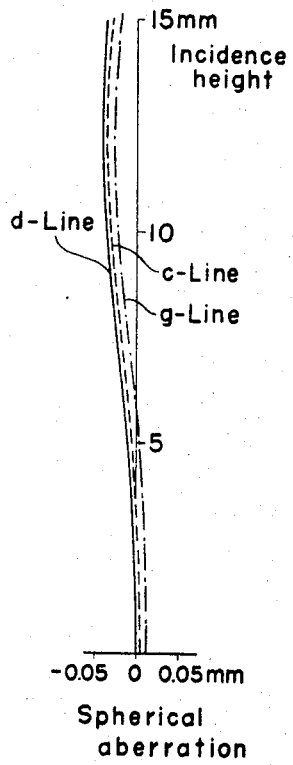
FIG. 2 illustrates a graph of spherical aberration in one embodiment of the high speed catadioptric optical system according to the present invention.
Figure 3:
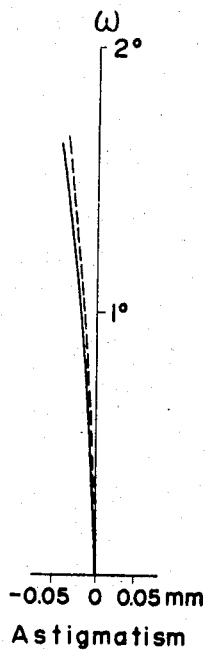
FIG. 3 illustrates a graph of astigmatism in the same embodiment in FIG. 2.
Figure 4:
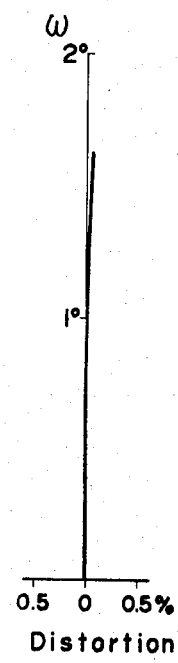
FIG. 4 illustrates a graph of distortion in the same embodiment in FIG. 2 and FIG. 3.

FIGS. 2, 3, and 4 show respectively the aberration curves for the spherical aberration, astigmatism, distortion, and chromatic aberration in the above mentioned embodiment, which suggest an excellent quality of the catadioptric system according to this invention.

EXAMPLE 2

$f=1$   Relative aperture=1:3.3
Covering angle=3.3°   Back focus=0.24115

| | | | |
|---|---|---|---|
| $R_1=-0.40229$ | $d_1=0.025$ | $N_1=1.56133$ | $V_1=64.1$ |
| $R_2=-0.42518$ | $l_1=0.3944$ | | |
| $R_3=-1.56669$ | $d_2=0.0375$ | $N_2=1.51633$ (Reflecting surface) | $V_2=64.1$ |
| $R_4=-1.49813$ | $d_3=d_2$ | $N_3=N_2$ | $V_3=V_2$ |
| $R_5=R_3$ | $l_2=0.3724$ | | |
| $R_6=-1.35456$ | $l_3=0.33175$ | (Reflecting surface) | |
| $R_7=0.86217$ | $d_4=0.0125$ | $N_4=1.58913$ | $V_4=61.2$ |
| $R_8=-0.28661$ | $d_5=0.00875$ | $N_5=1.6727$ | $V_5=32.2$ |
| $R_9=-0.78556$ | | | | where $R_1$, $R_2$ ... $d_1$, $d_2$ ... $l_1$, $l_2$ ... $N_1$, $N_2$ ...; and $V_1$, $V_2$ ... designate the same as explained in respect of Example 1.

EXAMPLE 3

$f=1$   Relative aperture=1:3.3
Covering angle=3.3°   Back focus=0.24065

| | | | |
|---|---|---|---|
| $R_1=-0.43803$ | $d_1=0.025$ | $N_1=1.51633$ | $V_1=64.1$ |
| $R_2=-0.47013$ | $l_1=0.37939$ | | |
| $R_3=-1.54117$ | $d_2=0.0375$ | $N_2=1.51633$ (Reflecting surface) | $V_2=64.1$ |
| $R_4=-1.44007$ | $d_3=d_2$ | $N_3=N_2$ | $V_3=V_2$ |
| $R_5=R_3$ | $l_2=0.35739$ | | |
| $R_6=-1.23912$ | $l_3=0.33196$ | (Reflecting surface) | |
| $R_7=0.69528$ | $d_4=0.00875$ | $N_4=1.6727$ | $V_4=32.2$ |
| $R_8=0.26459$ | $d_5=0.01250$ | $N_5=1.62041$ | $V_5=61.2$ |
| $R_9=-1.32104$ | | | | where $R_1$, $R_2$ ... ; $d_1$, $d_2$ ... ; $l_1$, $l_2$ ... ; $N_1$, $N_2$ ... ; and $V_1$, $V_2$ ... , designate the same as explained in respect of Example 1.

It will be understood that this invention is not limited to the specific materials, figures, etc., and other details described above and illustrated in the drawing, but can be carried out with various modifications without departing from the scope of the invention.

What is claimed is:

1. A high speed long focus catadioptric optical system consisting of four components: a correcting member of a single negative meniscus lens concave to the object, a main member consisting of a single positive meniscus lens concave to the object and a main mirror on its rear surface, a second mirror convex to the main member and an achromatic compound lens laid in the centering aperture of the main mirror facing to the second mirror and forming the image behind itself; said optical system satisfying the following conditions:

(I) The distance between the front vertex of the correcting lens and the image surface is of a value from $0.7f$ to $0.6f$;

(II) In the correcting lens, $$0.35f < |R_1| < |R_2| < 0.5f$$
$$d_1 < 0.04f;$$

(III) In the main member, $$1.3f < |R_4| < |R_3| < 1.6f$$
$$d_2 < 0.05f;$$

(IV) Concerning to the air spacings, $$0.3f < l_1, l_2 < 0.4f$$
$$0.25f < l_3 < 0.4f;$$

and (V) In the second mirror, $$0.9f < |R_6| < 1.4f$$

where:

$f$ denotes the focal length of the whole system, $R_1 R_2$—radii of curvature of the refractive and reflective surfaces, respectively, each subscript being a successive number ordered according to the passage of light, $d_1 d_2$—axial thickness of the respective lenses in the order as mentioned above, and $l_1 l_2$—air spacings in the order as mentioned above.

2. A high speed long focus catadioptric optical system of the following numerical value, $f=1$     Relative aperture=1:3.3
Covering angle=3.3°     Back focus=0.24111

| | | | |
|---|---|---|---|
| $R_1 = -0.40128$ | $d_1 = 0.025$ | $N_1 = 1.51633$ | $V_1 = 64.1$ |
| $R_2 = -0.42642$ | $l_1 = 0.367$ | | |
| $R_3 = -1.45056$ | $d_2 = 0.0375$ | $N_2 = 1.51633$ | $V_2 = 64.1$ |
| $R_4 = 1.38689$ | | (Reflecting surface) | |
| $R_5 = R_3$ | $d_3 = d_2$ | $N_3 = N_2$ | $V_3 = V_2$ |
| | $l_2 = 0.345$ | | |
| $R_6 = -1.14059$ | | (Reflecting surface) | |
| $R_7 = 0.625$ | $l_3 = 0.33485$ | | |
| $R_8 = 0.25319$ | $d_4 = 0.00875$ | $N_4 = 1.67270$ | $V_4 = 32.2$ |
| $R_9 = -1.07401$ | $d_5 = 0.0125$ | $N_5 = 1.58913$ | $V_5 = 61.2$ | where:

$R_1 R_2$—radii of curvature of the refractive and reflective surfaces, respectively, each subscript being a successive number ordered according to the passage of light, $d_1 d_2$—axial thicknesses of the respective lenses in the order as mentioned above, $l_1 l_2$—air spacings, in the order as mentioned above, $N_1 N_2$—refractive indices of the respective lenses for spectral $d$ line, in the order as mentioned above, $V_1 V_2$—Abbe's number of the respective lenses in the order as mentioned above.

References Cited

UNITED STATES PATENTS 2,726,574   12/1955   Mandler _____ 350—199
2,730,013   1/1956   Mandler _____ 350—201

JOHN K. CORBIN, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,438,695                                    April 15, 196

Yoshiya Matsui

It is certified that error appears in the above identified patent and that said Letters Patent are hereby corrected as shown below:

Column 7, line 24, "$d_8$" should read -- $d_3$ --; same line 2 "$N_8$" should read -- $N_3$ --; line 26, "$1_8$" should read -- $1_3$ --.

Signed and sealed this 27th day of October 1970.

(SEAL)
Attest:

Edward M. Fletcher, Jr.                             WILLIAM E. SCHUYLER, J1
Attesting Officer                                          Commissioner of Patent